Figure 1:
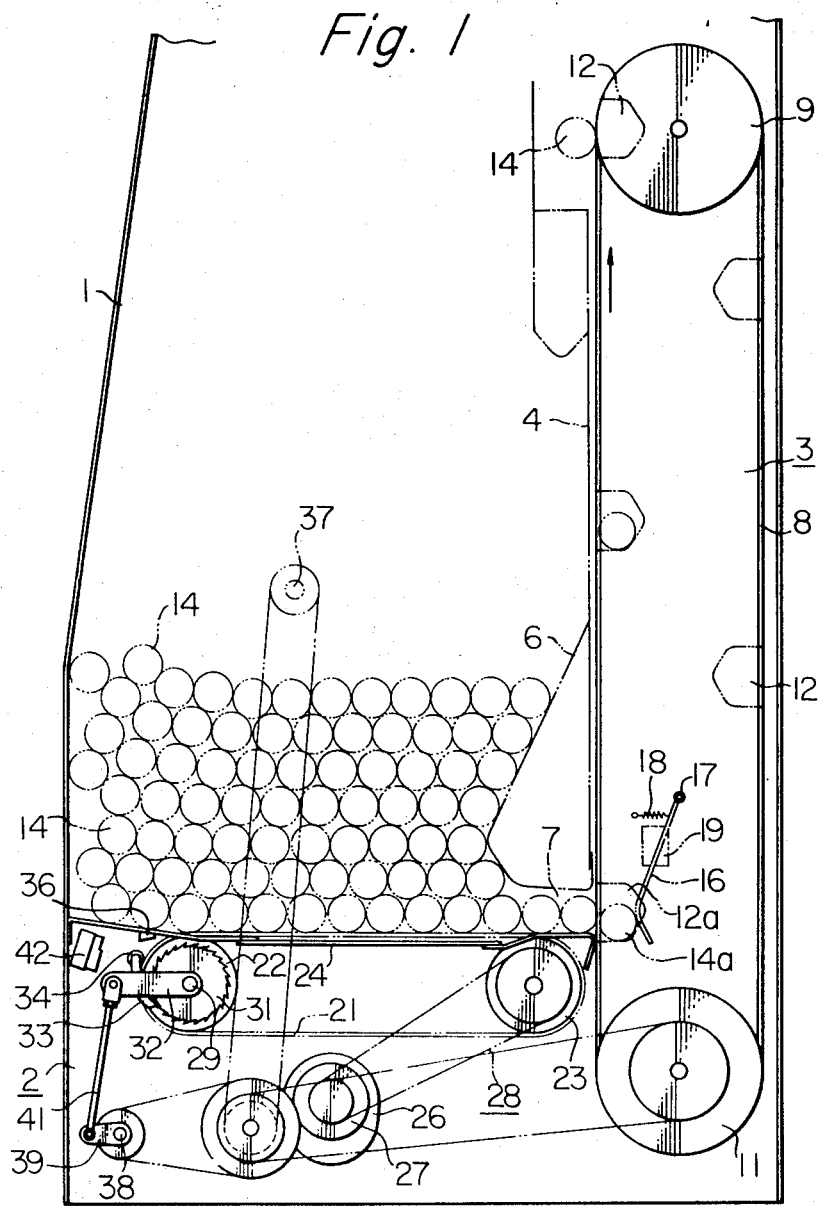

United States Patent [19]

Matsui et al.

[11] 3,777,932
[45] Dec. 11, 1973

[54] AUTOMATIC COP FEEDER

[75] Inventors: Isamu Matsui; Shozi Sakai; Masanobu Nishiyama, all of Kyoto, Japan

[73] Assignee: Murate Machinery, Ltd., Kyoto, Japan

[22] Filed: June 29, 1971

[21] Appl. No.: 157,878

[52] U.S. Cl. ............... 221/204, 221/236, 221/253
[51] Int. Cl. ............................................. B65h 5/02
[58] Field of Search............... 221/236, 237, 251, 221/253, 254, 204, 266, 259, 200; 198/110, 131

[56] References Cited
UNITED STATES PATENTS

| | | | |
|---|---|---|---|
| 423,033 | 3/1890 | Dieterich | 221/204 |
| 3,051,298 | 8/1962 | Knight | 198/110 X |
| 1,000,347 | 8/1911 | Schmidt | 221/259 |
| 439,030 | 10/1890 | Dieterich | 221/204 X |
| 3,447,707 | 6/1969 | Furst | 221/254 X |
| 808,067 | 12/1905 | Briggs | 221/253 |

FOREIGN PATENTS OR APPLICATIONS 667,892 3/1950 Great Britain ................... 221/241

*Primary Examiner*—Robert B. Reeves
*Assistant Examiner*—Thomas E. Kocovsky
*Attorney*—Robert E. Burns et al.

[57] ABSTRACT

Automatic cop feeder for feeding cops mounted in a container one by one in succession through a delivery path formed in the container to the next operational station while breaking possible cop bridges near inlet of the delivery path by giving shaking effect to cops in the container through alternate forward and return i.e. to and fro movements of an endless belt mounted at the bottom of the container.

13 Claims, 9 Drawing Figures

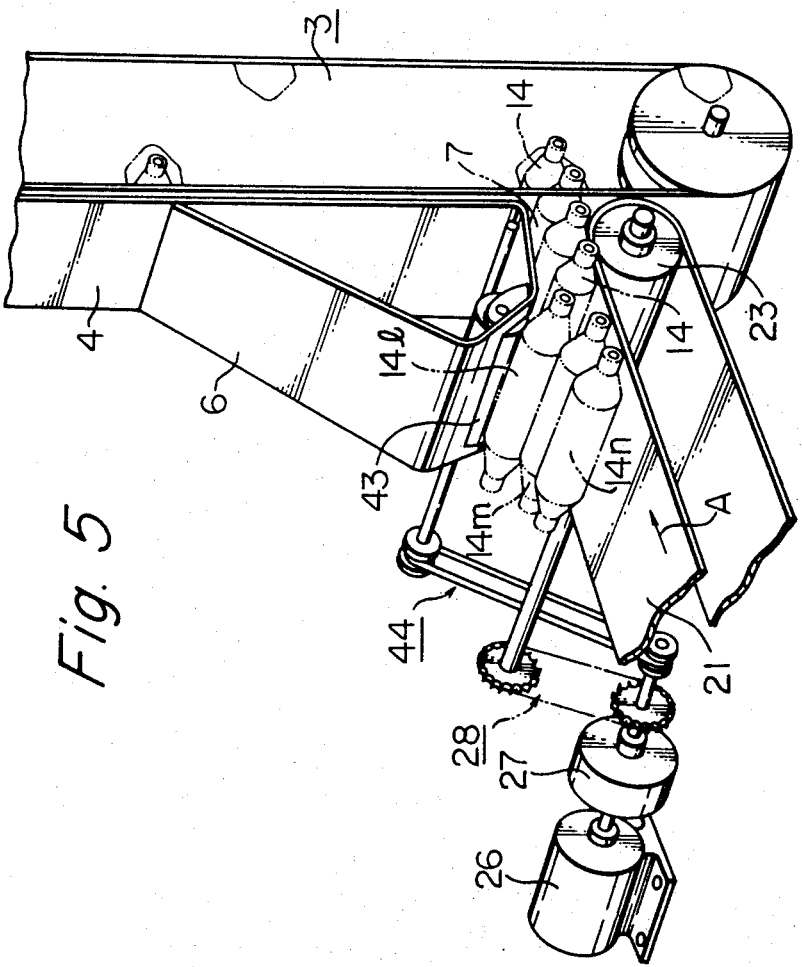

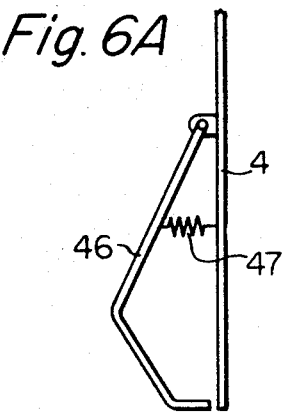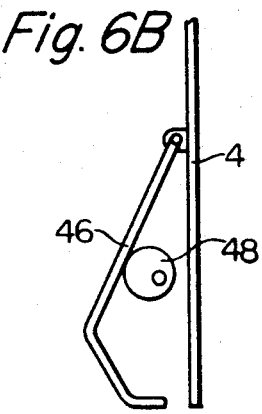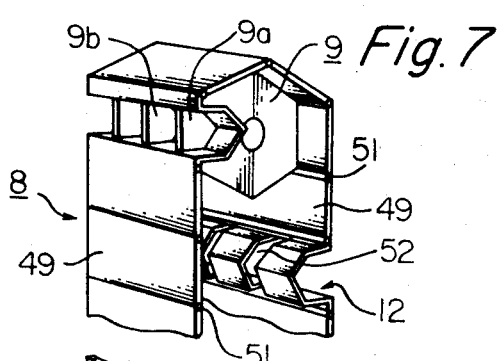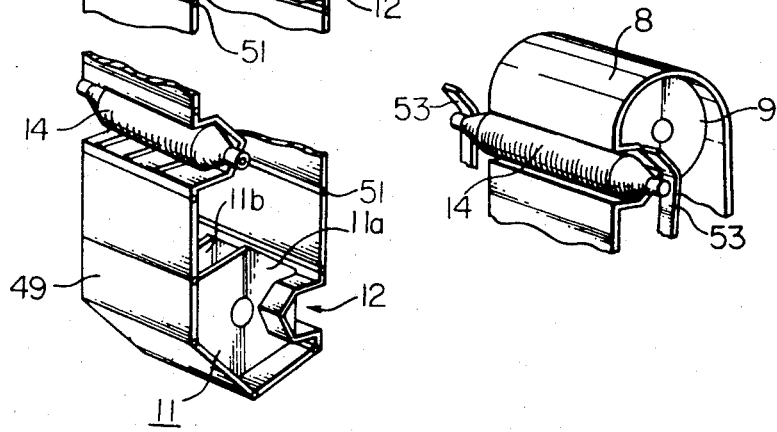

AUTOMATIC COP FEEDER

The present invention relates to an automatic cop feeder, more particularly relates to an automatic cop feeder for smoothly feeding cops in a container one by one in succession to the next operational station such as a rewinding station.

In the conventional system for automatically feeding cops in a container one by one in succession to the next operational station such as a rewinding station, smooth feeding of cops is often hindered by possible formation of a bridge of the cops near the cop discharge terminal of the container. Once such a bridge is formed by the cops in the container, subsequent movement of the cops towards the discharge terminal is hindered and the next operational station then has a shortage of new cops.

The principal object of the present invention is to prevent possible formation of the above-mentioned cops bridge in the cop container of the above-mentioned type.

In order to attain the above-mentioned object, the automatic cop feeder of the present invention employs an endless belt located at the bottom of the container which performs alternate forward and return movements, i.e. to and fro movements so as to shake the cops placed thereon to thereby break any cop bridges which have possibly formed near the discharge terminal of the container.

Figure 2:
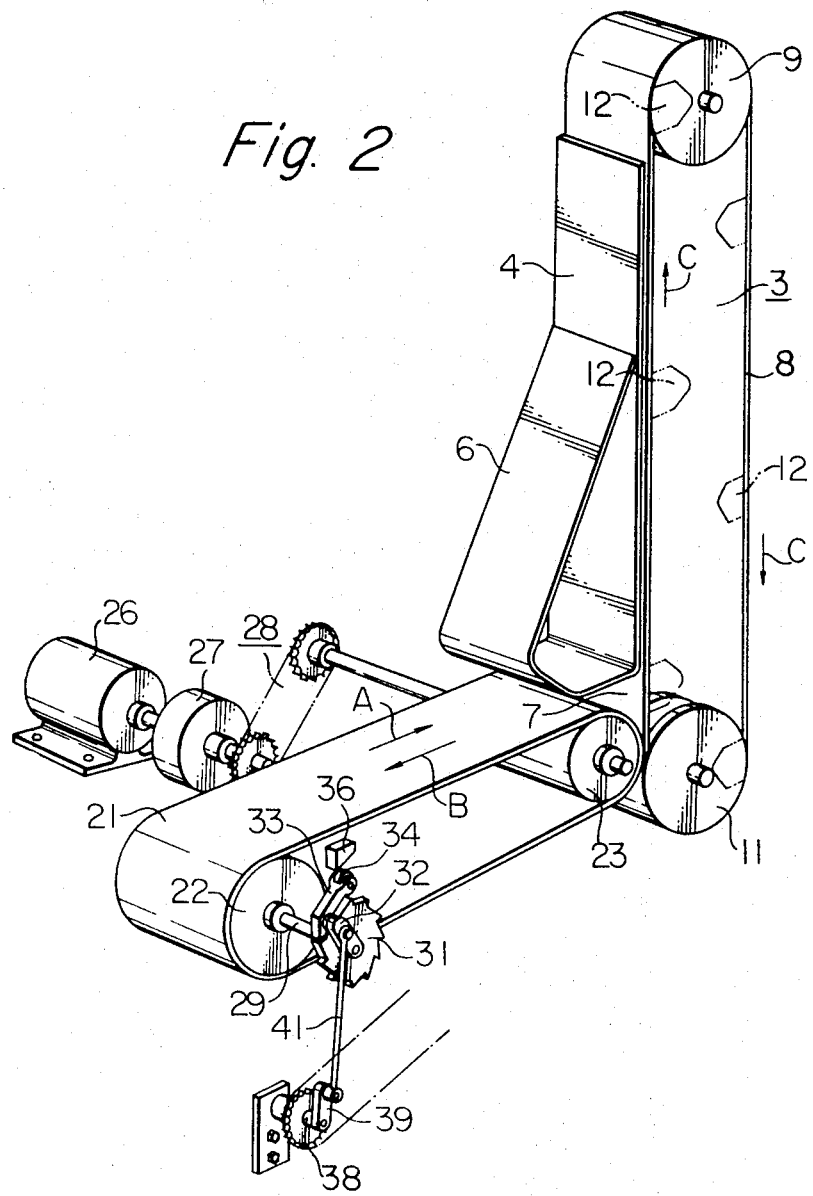
Figure 3:
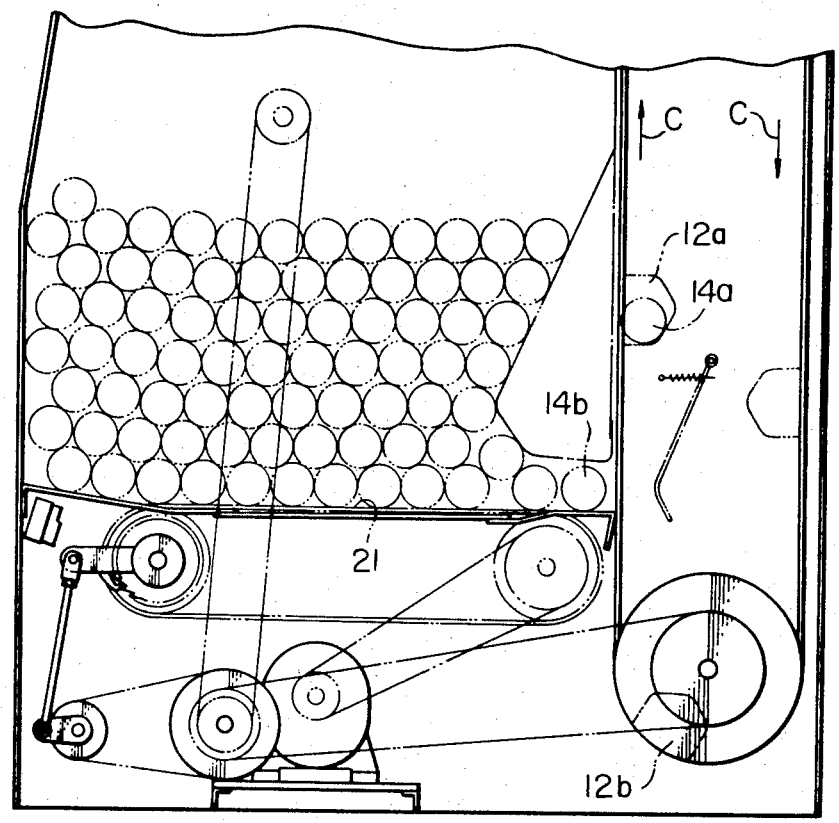

Further features and advantages of the present invention will be hereinafter explained in more detail, reference being made to the accompanying drawings, wherein;

FIG. 1 is a partly sectional view of a basic embodiment of the automatic cop feeder of the present invention, FIG. 2 is a partly omitted perspective view of the cop feeder shown in FIG. 1, FIG. 3 is a partly sectional side explanatory view of the operation of the cop feeder shown in FIGS. 1 and 2, FIGS. 4 and 5 are partly omitted perspective views of another embodiment of the cop feeder of the present invention, FIGS. 6A and 6B are side views of a swing plate usable in a modified embodiment of the cop feeder shown in FIGS. 1 to 3, FIG. 7 is a partly omitted perspective view of an endless belt conveyer usable in a modified embodiment of the cop feeder shown in FIGS. 1 to 3, FIG. 8 is a partly omitted perspective view of an endless belt conveyer usable in a modified embodiment of the cop feeder shown in FIGS. 1 to 3.

Referring to FIGS. 1 to 3, a basic embodiment of the automatic cop feeder of the present invention is shown. The cop feeder includes, as its main parts, a cop container 1, a horizontal cop conveyer part 2 whereon the cop container 1 is mounted and a vertical cop conveyer tower 3 erected facing a bottom cop delivery side of the cop container 1.

As is clearly seen from FIG. 2, the cop container 1 is provided, in addition to its three side walls, with a side wall 4 facing the cop conveyer tower 3 and the side wall 4 is provided, at its lower side, with an inward extension 6 diverging downwardly. The bottom of the extension 6 is spaced from the bottom line of the container 1 so as to define a cop delivery path 7 whose height is slightly greater than the cop diameter (see FIG. 1).

Inside the conveyer tower 3, an endless belt conveyer 8 is mounted for circulation running over a pair of driver skeletons or drive wheels 9 and 11. The belt conveyer 8 is provided with transversly extending cop pockets 12 spaced from each other at prescribed distances. One side wall 13 of the conveyer tower 3 leads away from the endless belt conveyer 8 near the upper termination of the latter for an easy escape of the cops 14 from the cop pockets 12. Inside the conveyer tower 3 near a delivery outlet of the cop delivery path 7, a cop feeler 16 is pivoted to a stationary part of the conveyer tower 3 at a point 17. A tension spring 18 is connected to the cop feeler 16 so that a lower free end of the feeler 16 resiliently contacts the cop 14 received in the cop pocket 12 from the delivery path 7. The cop feeler 16 is accompanied by a micro-switch 19 which is operated by the cop feeler 16 as is later described in detail. In FIG. 2, this cop feeler mechanism is omitted for ease of illustration.

The horizontal cop conveyer part 2 mainly consists of a movable conveying member in the form of an endless belt 21 running over a pair of horizontally spaced driver rollers 22 and 23. The endless belt 21 is so arranged that its upper run is positioned higher than a bottom plate 24 of the cop container 1. The width of the endless belt 21 corresponds to the length of the cops 14 to be processed. Although only a belt member is used in the illustrated embodiment for this endless belt 21, two or more strips of shorter width may be used arranged in parallel runs.

The driver roller 23 is connected to a driving source 26, an electric motor in the example shown, for rotation thereof via an electromagnetic clutch 27 and a chain transmission mechanism 28. This clutch 27 is electrically connected to the micro-switch 19 of the conveyer tower 3.

The other driver roller 22 is fixedly mounted on a rotational shaft 29 as is better seen in FIG. 2. On an outer extension of the shaft 29, a ratchet wheel 31 is fixedly mounted also and, further outside the ratchet wheel 31, a swing lever 32 is turnably mounted on the shaft 29. At a free end of the swing lever 32, a pawl 33 is disposed meshing with the teeth of the ratchet wheel 31. Although not visible in the drawing illustration, a suitable resilient member is provided in combination with the pawl 33 so as to resiliently urge the latter to mesh with the teeth of the ratchet wheel 31. The other elongated end of the pawl 33 is provided with a cam follower roll 34. Above the pawl 33, a cam 36 is fixed to a stationary part of the conveyer part 2. When the pawl 33 arrives at its uppermost position, the follower roll 34 is pushed down through contact with the cam 36 and the meshing of the pawl 33 with the teeth of the ratchet wheel 31 is cancelled.

As seen in FIG. 1, there is provided a shaft 37 which performs a one cycle rotation upon receipt of a rotational signal from a brake motor not shown. The rotation of the shaft 37 is transmitted to a crank shaft 38 located under the ratchet wheel mechanism via chain transmission mechanisms. This crank shaft 38 is connected to the swing lever 32 via a crank arm 39 and a connecting link 41.

In the vicinity of the ratchet wheel mechanism, a microswitch 42 is located and this micro-switch 42 is closed when the turning end of the swing lever 32 comes to its uppermost position, i.e. the pawl 33 is released from meshing with the teeth of the ratchet wheel 31. In other words, the microswitch 42 is provided for the purpose of confirmation of perfect cancellation of the above-mentioned meshing engagement.

When the micro-switch 42 is closed and the electromagnetic clutch 27 is transmitting rotation of the driving means 26 to the driver roller 23 and the endless belt 21 moves in a direction shown by an arrow A in FIG. 2. When the micro-switch 42 is opened and the shaft 37 is rotated, the pawl 33 rotates the ratched wheel 31 and the endless belt 21 moves in a direction shown by an arrow B in FIG. 2. The first mentioned movement of the endless belt 21 will be referred to as "the forward movement" whereas the second mentioned movement of the endless belt 21 will be referred to as "the return movement" in the ensuing description.

The speed and the stroke of both movements can be adjusted as desired by adjustment of the ratchet wheel mechanism or by insertion of a suitable variable speed controller between the electromagnetic clutch 27 and the driver roller 23. The variable speed controller may be accompanied by a suitable timer for periodically changing the speed transmission ratio of the controller.

Rotation of the shaft 37 is transmitted to the lower driver skeleton 11 of the conveyer tower 3 so as to circulate same in the direction shown by the arrow C.

The automatic cop feeder of the above-explained construction functions in the following manner, reference being made to FIG. 3 also.

When the electromagnetic clutch 27 is engaged, the driver roller 23 rotates in the clockwise direction in the drawing illustration and the endless belt 21 performs a forward movement in the direction A. By this forward movement of the belt 21, the bottommost cops 14 in the container 14 are positively fed in a single line arrangement along the cop delivery path 7 and the first cop 14a is received in the cop pocket 12a of the belt conveyer 8 (see FIG. 1). Upon completion of the receipt of the first cop 14a in the cop pocket 12a, the upper shaft 37 starts its one cycle rotation. By this rotation of the shaft 37, the lower driver skeleton 11 rotates clockwise and the belt conveyer 8 circulates in the direction C. Following this circulation, the first cop 14a held in the cop pocket 12a is lifted and the next cop pocket 12b approaches the outlet terminal of the cop delivery path 7 where the second cop 14b is standing by (see FIG. 3). This lifting of the first cop 14a is sensed by the feeler 16 of the conveyer tower 3 and, upon this sensing, the microswitch 19 operates so as to disengage the electromagnetic clutch 27 and the belt 21 ceases its forward movement.

Concurrently with the circulation of the belt conveyer 8 in the conveyer tower 3, rotation of the upper shaft 37 is transmitted to the ratchet wheel mechanism. During one cycle rotation of the shaft 37, the pawl 33 rotates the ratchet wheel 31 counterclockwise and the endless belt 21 performs its return movement in the direction B over a prescribed stroke. By this return movement of the belt 21, bottom raw cops 14 resting on the belt 21 move away from the inlet terminal of the cop delivery path 7 and the cops 14 in the container 1 change their positions slightly. In other words, a kind of shake or random disturbance is imparted to the cops 14 and possible bridge formation of the cops 14 near the inlet terminal and any obstruction of the cop delivery path 7 is eliminated by this shaking effect.

Upon arrival of the next cop pocket 12b at the outlet terminal of the cop delivery path 7, the upper shaft 37 completes its one cycle rotation. At this moment, the cam follower roll 34 of the pawl 33 is pressed down by contact with the cam 36 so as to disengage the pawl 33 from the ratchet wheel 31. This disengagement causes closing of the micro-switch 42. On the other hand, the micro-switch 19 in the conveyer tower 3 has already been closed by the sensing of the absence of the cop 14 by the cop feeler 16.

By closing the two micro-switches 19 and 42, the electromagnetic clutch 27 is again engaged and rotation of the driving source 26 is duly transmitted to the driver roller 23 so as to make the endless belt 21 perform the next forward movement.

Figure 4:
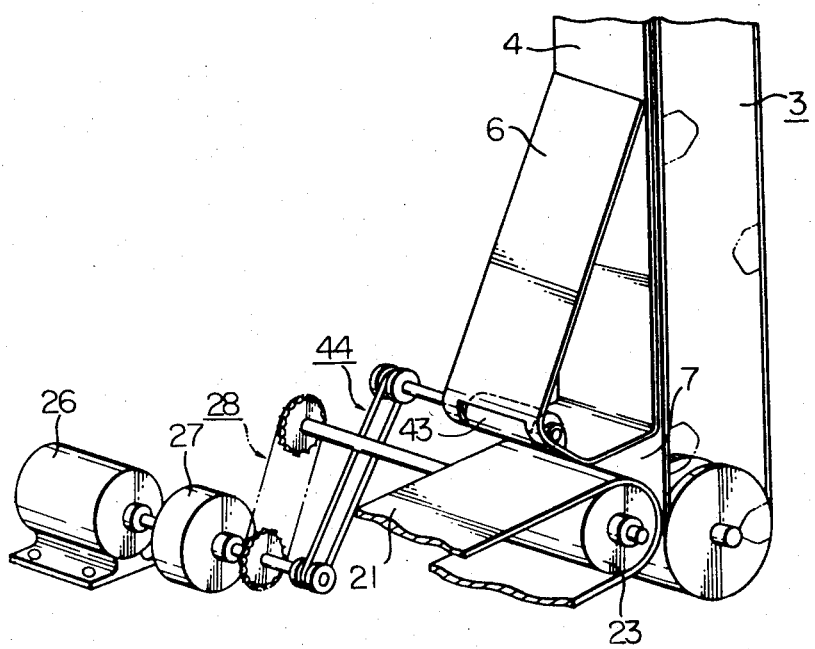

A modified embodiment of the automatic cop feeder of FIGS. 1 to 3 is shown in FIGS. 4 and 5, wherein the inward extension 6 is provided with a transverse and horizontal cut-off at the bottom end thereof near the inlet terminal of the cop delivery path 7. A bridge breaker roller 43 is disposed with its axial direction transversing the inward extension 6. The periphery of the bridge breaker roller 43 is partly exposed outwardly into the cop delivery path 7 through the cut-off of the inward extension 6. Further, the roller 43 is connected to the driving source 26 for rotation via a transmission mechanism 44 and the electromagnetic clutch 27. Because the endless belt 21 is also connected to the driving source 26 for circulation via the chain transmission mechanism 28 and the electromagnetic clutch 27, rotation of the bridge breaker roller 43 synchronizes with the forward movement of the endless belt 21, which has already been explained in detail in relation to the basic embodiment.

When the endless belt 21 performs the forward movement and the cops 14 are brought towards the outlet terminal of the delivery path 7, the roller 43 rotates clockwise in FIG. 5 and the cop 14L contacting the roller 43 is urged away from the delivery path 7 by rotation of the roller 43. This pushing back of the cop 14l causes an associated replacement of the neighboring cops 14m and 14n in the vicinity of the inlet terminal of the cop delivery path 7 and, thereby, possible formation of a cop bridge in that area is effectively prevented.

In this embodiment, the bridge breaker roller 43 may be provided with lengthwisely fluted peripheral surface. Further, the bridge breaker roller 43 may be mounted eccentrically on its rotational shaft.

In the foregoing two embodiments, the inward extension 6 is structured to be stationary to the side wall 4 of the cop container 1. However, the stationary inward extension 6 may be replaced by a swing plate 46 which extends inwardly and is pivoted to the side wall 4 at its one end. In the embodiment shown in FIG. 6A, the swing plate 46 is always urged inwardly by a compression spring 47 inserted between the swing plate 46 and the side wall 4. When the cops 14 in the container 1 are shaken by the movement of the endless belt 21 and/or by the rotation of the bridge breaker roller 43, the swing plate 43 swings inwardly so as to assist the shaking. In the embodiment shown in FIG. 6B, a crank mechanism 48 is disposed instead of the compression spring 47 and rotation thereof periodically swings the plate 46 for the same purpose.

In all the described embodiments, the cop container 1 is provided with the inward extension 6 or the swing plate 46 at its lower part in the vicinity of the cop delivery path 7 for a smooth feed of the cops 14 into the cop delivery path 7. However, once the inlet terminal of the cop delivery path 7 opens at the bottom part of the side wall 4 on the side of the conveyer tower 3, the inward extension 6 and the swing plate 46 may be omitted.

Referring to FIG. 7, a modified embodiment of the endless belt conveyor 8 and its related parts within the conveyer tower 3 is shown. In this embodiment, the upper driver skeleton 9 is made up of multiple hexagonal discs 9a, 9b, etc. which are fixedly mounted on a central rotational shaft in a mutually spaced arrangement. In the same manner, the lower driver skeleton 11 is made up of multiple hexagonal discs 11a, 11b, etc. The belt conveyer 9 is made up of multiple caterpillar segments 49 endlessly connected with each other by pin joints 51. The length of the caterpillar segments 49 corresponds to one side length of the hexagonal disc, e.g. the disc 9a or the disc 11a. At selected intervals, certain caterpillar segments 49 are provided with the transverse cop pockets 12, wherein the cops 14 are to be received. Segment walls defining the cop pocket 12 are provided with slits 52 at intervals corresponding to the distances between the hexagonal discs of the driver skeletons 9 and 11.

When the cop pocket 12 holding the cop 14 comes to the level of the upper driver skeleton 9 following circulation of the belt conveyer 8, the hexagonal discs 9a, 9b, etc. are inserted inside of the cop pocket 12 through the corresponding slits 52 as seen in the illustration and the cop 14 held in the cop pocket 12 is pushed outside the pocket 12 by the peripheral fringes of the hexagonal discs so as to fall onto the next operational station.

Although hexagonal discs are used for the driver skeletons in the illustrated arrangement, discs of any polygonal profile may be used in combination with caterpillar segments of suitably selected length in the present embodiment.

Another embodiment of the arrangement for an easy throwout of the cop 14 from the cop pocket 12 at the upper terminal of the belt conveyer circulation is shown in FIG. 8, wherein a pair of guide rails 53 are stationarily mounted inside the conveyer tower 3 in an arrangement contactable with cop ends when the cop 14 arrives at the level of the upper driver skeleton 9. Upper ends of the guide rails 53 are curved towards the outside of the run of the belt conveyer 8. As the cop 14 held in the cop pocket 12 approaches the upper terminal of the conveyer belt circulation, both ends of the cop 14 contact the guide rail 53 and the cop 14 is pushed outside the pocket 12 due to the upper end curvature of the rail 53.

The mode of the forward and return movement of the bottom endless belt 21 of the automatic cop feeder of the present invention can be designed as desired, as follows. In one example, the stroke and the speed of the forward movement may be designed to be larger than those of the return movement whereas, in another example, the stroke and the speed of the forward movement may be designed to be equal to those of the return movement.

What is claimed is:

1. Automatic cop feeder comprising, in combination, a substantially upright cop container having at the bottom thereof a cop delivery path along which cops are to be delivered to an outlet terminals, an endless belt disposed at the bottom of said container and having a horizontal upper run extending into the interior of said cop container from the bottom for transporting cops lying thereon towards said outlet terminal in response to forward movement of said upper run in a direction towards said outlet terminal, means for imparting alternate forward and return movements to said endless belt, transporting means for transporting cops delivered one by one from said outlet terminal of said cop delivery path towards the next operational terminal, and means for actuating said imparting means at prescribed intervals for said foward and return movements of said endless belt to prevent the cops from forming a blockage along said cop delivery path.

2. Automatic cop feeder as claimed in claim 1, wherein said last-mentioned means includes means for making the stroke and speed of said forward movement of said endless belt equal to those of said return movement thereof.

3. Automatic cop feeder ac claimed in claim 1, wherein said last-mentioned means includes means for making the stroke and speed of said forward movement of said endless belt are larger than those of said return movement thereof.

4. Automatic cop feeder as claimed in claim 1, further comprising a rotatable bridge breaker roller disposed facing an inlet terminal of said cop delivery path and mechanically connected to said imparting means for rotation thereof in synchronism with said forward movement of said endless belt.

5. Automatic cop feeder as claimed in claim 4, including means mounting said bridge breaker roller for eccentric rotation.

6. Automatic cop feeder as claimed in claim 1, wherein said imparting means includes a pair of spatially arranged driver rollers over which said endless belt runs, a driving source connected to one of said driver roller, an electromagnetic clutch disposed between said driving source and said one driver roller for clutching same together to effect forward movement of said endless belt, another driving source connected to the other one of said driver rollers for effecting return movement of said endless belt, and a ratchet wheel mechanism disposed between said another driving source and said other driver roller.

7. Automatic cop feeder as claimed in claim 6, further comprising a variable speed controller inserted between said electromagnetic clutch and said one driver roller.

8. Automatic cop feeder as claimed in claim 1, wherein said cop container is provided inside with an inward extension disposed on a cop discharge side wall of said cop container and whose bottom wall defines a ceiling of said cop delivery path.

9. Automatic cop feeder as claimed in claim 8, wherein said inward extension comprises a swing plate pivoted at said cop discharge side wall of said cop container, and resilient means for resiliently urging said swing plate toward the interior of said cop container.

10. Automatic cop feeder as claimed in claim 8, wherein said inward extension comprises a swing plate pivoted at said cop discharge side wall of said cop container, and means including a crank mechanism for periodically swinging said swing plate towards the interior of said cop container.

11. Automatic cop feeder as claimed in claim 1, wherein said transporting means includes an endless belt conveyer having transversely extending cop pockets which are located at selected interval along the length of said belt conveyer and running partly facing said outlet terminal of said cop delivery path for one by one receipt of said cops into said cop pockets, and a pair of driver skeletons spaced from each other and over which said belt conveyer runs and one of which is connected to said imparting means for circulation in synchronism with said return movement of said bottom endless belt.

12. Automatic cop feeder as claimed in claim 11, wherein said driver skeleton comprises a plurality of polygonal discs spacially aligned on a rotational shaft, and wherein said belt conveyer comprises multiple caterpillar segments connected in succession by pin joints and each having a length corresponding to one side length of each polygonal disc and said cop pocket is provided with slits for allowing insertion therein of said polygonal discs when its associated caterpiller segment comes in contact with said driver skeleton.

13. Automatic cop feeder as claimed in claim 11, further comprising a pair of guide rails disposed near an upper termination of said endless conveyer and each having its upper end curved towards said next operational station in such an arrangement that both cop ends contact said guide rails when said cop held in said cop pocket approches said upper termination.

* * * * *